*(12)* United States Patent
Li et al.

US010946634B2

(10) Patent No.: US 10,946,634 B2
(45) Date of Patent: Mar. 16, 2021

(54) TRANSFER DEVICE, CURING SYSTEM AND CURING METHOD

(71) Applicants: BOE Technology Group Co., Ltd., Beijing (CN); CHONGQING BOE OPTOELECTRONICS TECHNOLOGY CO., LTD., Chongqing (CN)

(72) Inventors: Jiakun Li, Beijing (CN); Jingxuan Tu, Beijing (CN); Chong Liu, Beijing (CN); YunXiao Fu, Beijing (CN); Chao Xu, Beijing (CN); Lei Yang, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 219 days.

(21) Appl. No.: 16/111,083

(22) Filed: Aug. 23, 2018

(65) Prior Publication Data

US 2019/0217596 A1     Jul. 18, 2019

(30) Foreign Application Priority Data

Jan. 15, 2018   (CN) .......................... 201810034991.3

(51) Int. Cl.
*B32B 41/00*       (2006.01)
*B32B 39/00*       (2006.01)
(Continued)

(52) U.S. Cl.
CPC ................ *B32B 39/00* (2013.01); *B32B 7/12* (2013.01); *B32B 38/00* (2013.01); *B32B 2038/0076* (2013.01); *B32B 2457/202* (2013.01)

(58) Field of Classification Search
CPC ........... B32B 39/00; B32B 7/12; B32B 38/00; B32B 2457/202; B32B 2038/0076; B05D 3/067; B65G 47/80
(Continued)

(56) References Cited

U.S. PATENT DOCUMENTS 10,072,336 B2    9/2018   Kato et al.
2009/0169341 A1  7/2009   Fan
(Continued)

FOREIGN PATENT DOCUMENTS

CN        2920518 Y      7/2007
CN       101960581 A     1/2011
(Continued)

OTHER PUBLICATIONS

Office Action issued in corresponding Chinese Patent Application No. 201810034991.3, dated Oct. 16, 2019.
(Continued)

*Primary Examiner* — Michael N Orlando
*Assistant Examiner* — Joshel Rivera
(74) *Attorney, Agent, or Firm* — McDermott Will & Emery LLP (57) ABSTRACT

Embodiments of the present disclosure provide a transfer device, a curing system with the transfer device and a curing method using the curing system. The transfer device includes: a mount; a rotary stage mounted to the mount and configured to be rotatable about a first axis; and a rotary table mounted to the rotary stage and configured to be rotatable about a second axis.

13 Claims, 5 Drawing Sheets

(51) Int. Cl.
B32B 7/12 (2006.01)
B32B 38/00 (2006.01)

(58) Field of Classification Search
USPC .................. 156/60, 64, 350, 351, 378, 379
See application file for complete search history.

(56) References Cited

U.S. PATENT DOCUMENTS

| | | | |
|---|---|---|---|
| 2011/0114258 A1 | 5/2011 | Chau et al. | |
| 2011/0192542 A1* | 8/2011 | Kim | G02F 1/1303 156/378 |
| 2012/0037317 A1* | 2/2012 | Han | B32B 41/00 156/378 |
| 2015/0083550 A1* | 3/2015 | Wilson | B65G 29/00 198/376 |
| 2016/0122872 A1 | 5/2016 | Kato et al. | |
| 2018/0327906 A1 | 11/2018 | Kato et al. | |

FOREIGN PATENT DOCUMENTS

| | | |
|---|---|---|
| CN | 102069057 A | 5/2011 |
| CN | 104882402 A | 9/2015 |
| CN | 204640467 U | 9/2015 |
| CN | 105568259 A | 5/2016 |
| CN | 206216494 U | 6/2017 |
| CN | 106984509 A | 7/2017 |
| CN | 206464991 U | 9/2017 |
| DE | 10217113 A1 | 10/2003 |
| JP | S63225020 A | 9/1988 |

OTHER PUBLICATIONS

Office Action issued in corresponding Chinese Patent Application No. 201810034991.3, dated Apr. 16, 2019.

* cited by examiner

FIG. 8

TRANSFER DEVICE, CURING SYSTEM AND CURING METHOD

CROSS-REFERENCE TO RELATED APPLICATION

This application claims priority to Chinese Patent Application No. 201810034991.3, filed on Jan. 15, 2018, entitled "TRANSFER DEVICE, CURING SYSTEM AND CURING METHOD," which is incorporated herein by reference.

TECHNICAL FIELD

The present disclosure relates to a transfer device, a curing system including the transfer device and a curing method using the curing system.

BACKGROUND

In an outer lead bonding (OLB) processing procedure of industrial production process of a thin film transistor liquid crystal display (TFT-LCD), generally ultraviolet radiation (UV) is used to cure a UV curable adhesive applied to an electrode and a flexible printed circuit board of a display panel.

Figure 1:
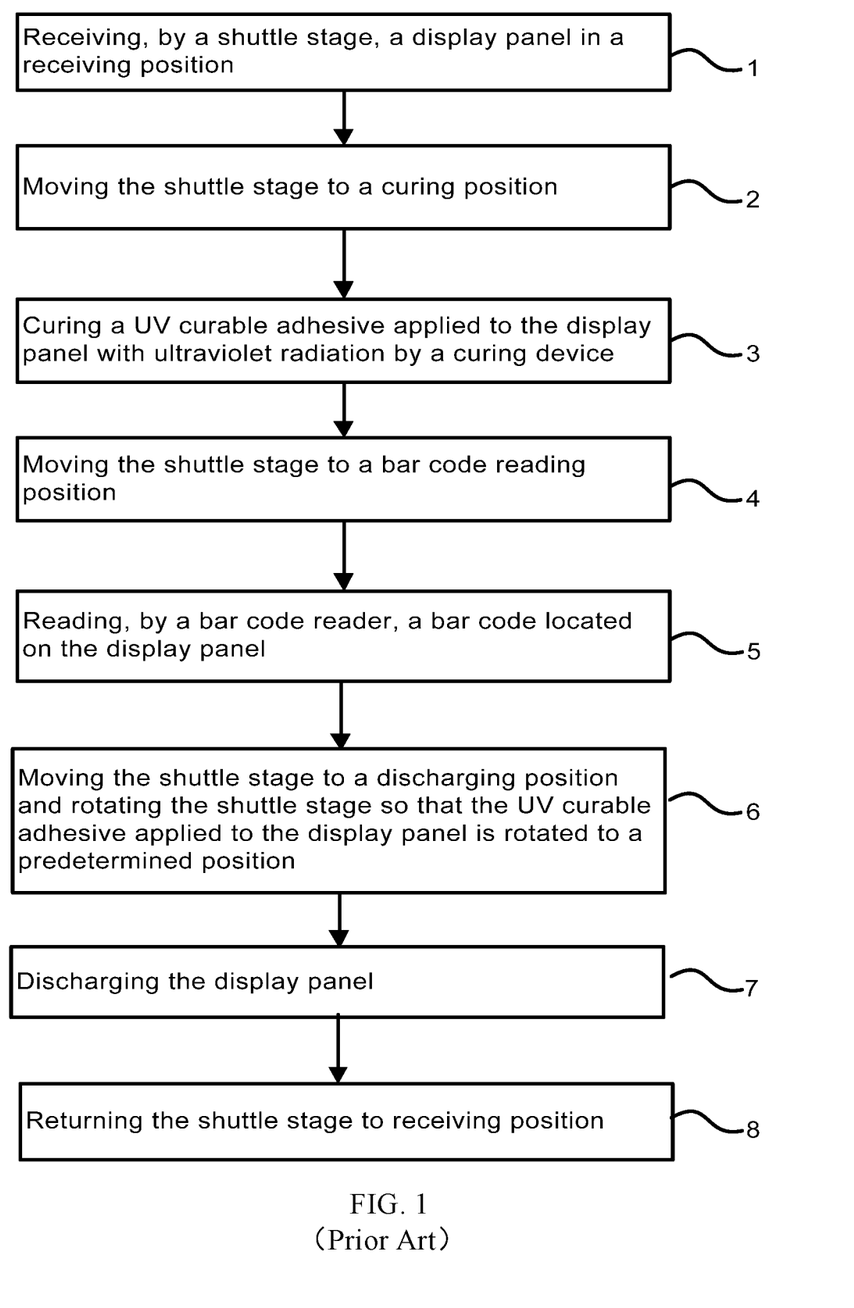
FIG. 1 is a schematic flow diagram of a conventional curing method using a shuttle stage.

Generally, a conventional curing method is achieved by means of a shuttle stage. As shown in FIG. 1, the conventional curing method includes: a step 1 of receiving, by a shuttle stage, a display panel in a receiving position; a step 2 of moving the shuttle stage to a curing position; a step 3 of curing a UV curable adhesive applied to the display panel with ultraviolet radiation by a curing device; a step 4 of moving the shuttle stage to a bar code reading position; a step 5 of reading, by a bar code reader (BCR), a bar code located on the display panel; a step 6 of moving the shuttle stage to a discharging position and rotating the shuttle stage so that the UV curable adhesive applied to the display panel is rotated to a predetermined position; a step 7 of discharging the display panel; and a step 8 of returning the shuttle stage to receiving position.

The shuttle stage can receive only a single display panel in sequence. Time for completing the cure of the UV curable adhesive is about 3.2 s~5 s, and time from the receipt to discharge of the display panel is 5.7 s~7.5 s.

SUMMARY

Various embodiments of the present disclosure provide a transfer device. The transfer device includes: a mount; a rotary stage mounted to the mount and configured to be rotatable about a first axis; and a rotary table mounted to the rotary stage and configured to be rotatable about a second axis.

According to embodiments of the present disclosure, the transfer device includes a plurality of rotary tables; the rotary stage includes: a central part; and a plurality of extension parts extending outwards from the central part; and the plurality of rotary tables are mounted to ends, located away from the central part, of the extension parts of the rotary stage, respectively.

According to embodiments of the present disclosure, the transfer device further includes: a vacuum chuck mounted to the rotary table.

According to embodiments of the present disclosure, the transfer device further includes: a first electric motor through which the rotary stage is mounted to the mount and which is configured to drive the rotary stage to rotate about the first axis with respect to the mount; and a second electric motor through which the rotary table is mounted to the rotary stage and which is configured to drive the rotary table to rotate about the second axis with respect to the rotary stage.

According to embodiments of the present disclosure, the first axis is located at a central position of the rotary stage; and the second axis is located at a central position of the rotary table.

According to embodiments of the present disclosure, each of the first axis and the second axis is a vertical axis.

According to embodiments of the present disclosure, the vacuum chuck is configured to hold a display panel and has: a gas chamber formed inside the vacuum chuck; a gas suction hole formed in a side surface of the vacuum chuck; and an adsorption hole which is formed in an upper surface of the vacuum chuck and which is in communication with the gas suction hole through the gas chamber.

According to embodiments of the present disclosure, each of the first electric motor and the second electric motor includes an output shaft and a housing; the housing of the first electric motor is connected to the rotary stage and the output shaft of the first electric motor is connected to the mount; and the output shaft of the second electric motor is connected to the rotary table and the housing of the second electric motor is connected to the rotary stage.

According to embodiments of the present disclosure, the transfer device includes a plurality of rotary tables.

Embodiments of the present disclosure further provide a curing system. The curing system includes: the above transfer device; and a curing device configured to cure an adhesive applied to a display panel.

According to embodiments of the present disclosure, the adhesive is a UV curable adhesive, and the curing device is configured to cure the UV curable adhesive applied to the display panel, with ultraviolet radiation.

According to embodiments of the present disclosure, the curing system further includes: an identification symbol reader configured to read an identification symbol located on the display panel; a feeder configured to feed the display panel to the transfer device; and a discharger configured to discharge the display panel from the transfer device, the transfer device includes 4 rotary tables arranged at an angular interval of 90 degrees about the first axis, such that each time the rotary stage rotates by 90 degrees about the first axis, the 4 rotary tables are located in a receiving position, an identification symbol reading position, a curing position, and a discharging position, respectively; the receiving position, the identification symbol reading position, the curing position, and the discharging position are arranged at an angular interval of 90 degrees about the first axis; and in the receiving position, the feeder feeds a display panel to a first one of the 4 rotary tables of the transfer device; in the identification symbol reading position, the identification symbol reader reads an identification symbol located on a display panel on a second one of the 4 rotary tables of the transfer device; in the curing position, the curing device cures an adhesive applied to a display panel on a third one of the 4 rotary tables of the transfer device; and in the discharging position, the discharger discharges a display panel located on a fourth one of the 4 rotary tables of the transfer device.

Various embodiments of the present disclosure further provide a method of curing an adhesive, applied to a display panel, by using the above curing system, the method including: receiving, by the rotary table, the display panel in a receiving position; rotating, by rotating the rotary stage about the first axis, the rotary table to a curing position about the first axis, and rotating, by rotating the rotary table about the second axis, the adhesive applied to the display panel to a first predetermined position about the second axis; curing, by the curing device, the adhesive applied to the display panel; rotating, by rotating the rotary stage about the first axis, the rotary table to a discharging position about the first axis, and rotating, by rotating the rotary table about the second axis, the adhesive applied to the display panel to a second predetermined position about the second axis; and discharging the display panel.

According to embodiments of the present disclosure, rotating, by rotating the rotary stage about the first axis, the rotary table to the curing position about the first axis, and rotating, by rotating the rotary table about the second axis, the adhesive applied to the display panel to the first predetermined position about the second axis, includes: rotating, by rotating the rotary table by a first predetermined angle about the second axis, the adhesive applied to the display panel to the first predetermined position about the second axis; and then rotating, by rotating the rotary stage about the first axis, the rotary table to the curing position about the first axis; or rotating, by rotating the rotary stage about the first axis, the rotary table to the curing position about the first axis; and then rotating, by rotating the rotary table by the first predetermined angle about the second axis, the adhesive applied to the display panel to the first predetermined position about the second axis.

According to embodiments of the present disclosure, rotating, by rotating the rotary stage about the first axis, the rotary table to the discharging position about the first axis, and rotating, by rotating the rotary table about the second axis, the adhesive applied to the display panel to the second predetermined position about the second axis, includes: rotating, by rotating the rotary stage about the first axis, the rotary table to the discharging position about the first axis; and then rotating, by rotating the rotary table by a second predetermined angle about the second axis, the adhesive applied to the display panel to the second predetermined position about the second axis; or rotating, by rotating the rotary table by the second predetermined angle about the second axis, the adhesive applied to the display panel to the second predetermined position about the second axis; and then rotating, by rotating the rotary stage about the first axis, the rotary table to the discharging position about the first axis.

According to embodiments of the present disclosure, rotating, by rotating the rotary stage about the first axis, the rotary table to the curing position about the first axis, and rotating, by rotating the rotary table about the second axis, the adhesive applied to the display panel to the first predetermined position about the second axis, includes: rotating, by rotating the rotary table by the first predetermined angle about the second axis, the adhesive applied to the display panel to the first predetermined position about the second axis, while rotating, by rotating the rotary stage about the first axis, the rotary table to the curing position about the first axis.

According to embodiments of the present disclosure, rotating, by rotating the rotary stage about the first axis, the rotary table to the discharging position about the first axis, and rotating, by rotating the rotary table about the second axis, the adhesive applied to the display panel to the second predetermined position about the second axis, includes: rotating, by rotating the rotary stage about the first axis, the rotary table to the discharging position about the first axis, while rotating, by rotating the rotary table by the second predetermined angle about the second axis, the adhesive applied to the display panel to the second predetermined position about the second axis.

According to embodiments of the present disclosure, the method further includes: subsequent to receiving, by the rotary table, the display panel in the receiving position, and prior to rotating, by rotating the rotary stage about the first axis, the rotary table to the curing position about the first axis, and rotating, by rotating the rotary table about the second axis, the adhesive applied to the display panel to the first predetermined position about the second axis, rotating, by rotating the rotary stage about the first axis, the rotary table to an identification symbol reading position about the first axis; and reading, by an identification symbol reader, an identification symbol located on the display panel.

According to embodiments of the present disclosure, the transfer device includes a plurality of rotary tables.

According to embodiments of the present disclosure, the transfer device includes 4 rotary tables arranged at an angular interval of 90 degrees about the first axis, such that each time the rotary stage rotates by 90 degrees about the first axis, the 4 rotary tables are located in the receiving position, an identification symbol reading position, the curing position, and a discharging position, respectively, and the receiving position, the identification symbol reading position, the curing position, and the discharging position are arranged at an angular interval of 90 degrees about the first axis; and in the receiving position, the feeder feeds a display panel to a first one of the 4 rotary tables of the transfer device; in the identification symbol reading position, the identification symbol reader reads an identification symbol located on a display panel on a second one of the 4 rotary tables of the transfer device; in the curing position, the curing device cures an adhesive applied to a display panel on a third one of the 4 rotary tables of the transfer device; and in the discharging position, the discharger discharges a display panel located on a fourth one of the 4 rotary tables of the transfer device.

BRIEF DESCRIPTION OF THE DRAWINGS

Other features, objects and advantages of embodiments of the present disclosure will become more apparent and are more readily appreciated by reading the detailed description of non-limiting examples in conjunction with the accompanying drawings.

DETAILED DESCRIPTION

A further description of the disclosure will be made in detail as below with reference to exemplary embodiments of the present disclosure taken in conjunction with the accompanying drawings. It should be understood that the embodiments set forth herein are only used to describe and explain the present disclosure and should not be construed to limit the present disclosure.

It should be noted that the embodiments of the present disclosure may be combined with each other unless they conflict and the features in the embodiments of the present disclosure may be combined with each other unless they conflict.

The present disclosure will be described in detail as below with reference to the accompanying drawings in combination with the embodiments.

In the drawings, a thickness of each element and a size and a shape of each region do not reflect a real scale of each element, and the only purpose is to schematically illustrate the embodiments of the present disclosure.

Referring to FIG. 2 to FIG. 5, embodiments of the present disclosure provide a transfer device. The transfer device includes: a mount 101; a rotary stage 102 mounted to the mount 101 and configured to be rotatable about a first axis 107; and a rotary table 103 mounted to the rotary stage 102 and configured to be rotatable about a second axis 108. For example, the first axis 107 is located at a central position of the rotary stage 102; and the second axis 108 is located at a central position of the rotary table 103. Each of the first axis 107 and the second axis 108 may be a vertical axis. The transfer device may include one or more rotary tables 103. For example, the transfer device may include 2, 3, 4, 5, 6, 7 or more rotary tables 103.

Referring to FIG. 2 to FIG. 5, in an embodiment of the present disclosure, the transfer device includes a plurality of rotary tables 103. The rotary stage 102 includes: a central part 1021; and a plurality of extension parts 1022 extending outwards from the central part 1021. The plurality of rotary tables 103 are mounted to ends, located away from the central part 1021, of the extension parts 1022 of the rotary stage 102, respectively. According to embodiments of the present disclosure, the rotary stage 102 may also have any other shape such as a disc shape.

Figure 2:
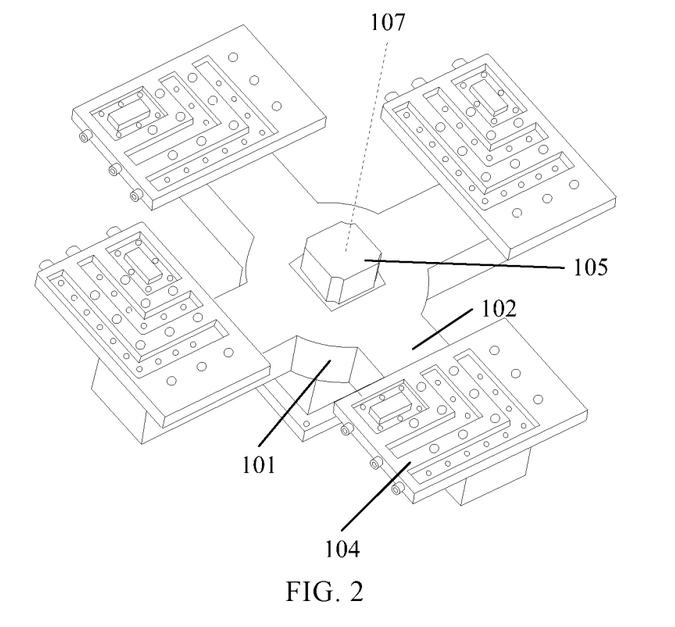
FIG. 2 is a schematic perspective view showing a structure of a transfer device according to an embodiment of the present disclosure.
Figure 3:
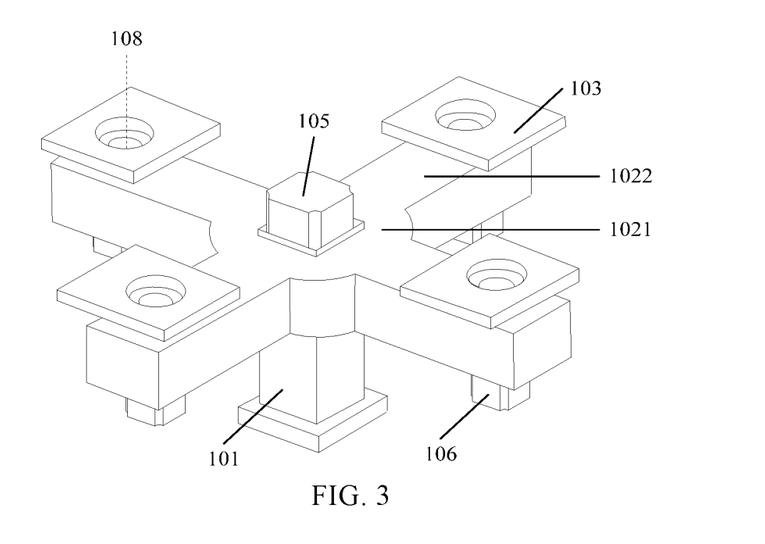
FIG. 3 is a schematic perspective view showing a structure of the transfer device according to the embodiment of the present disclosure, in which a vacuum chuck is removed.
Figure 4:
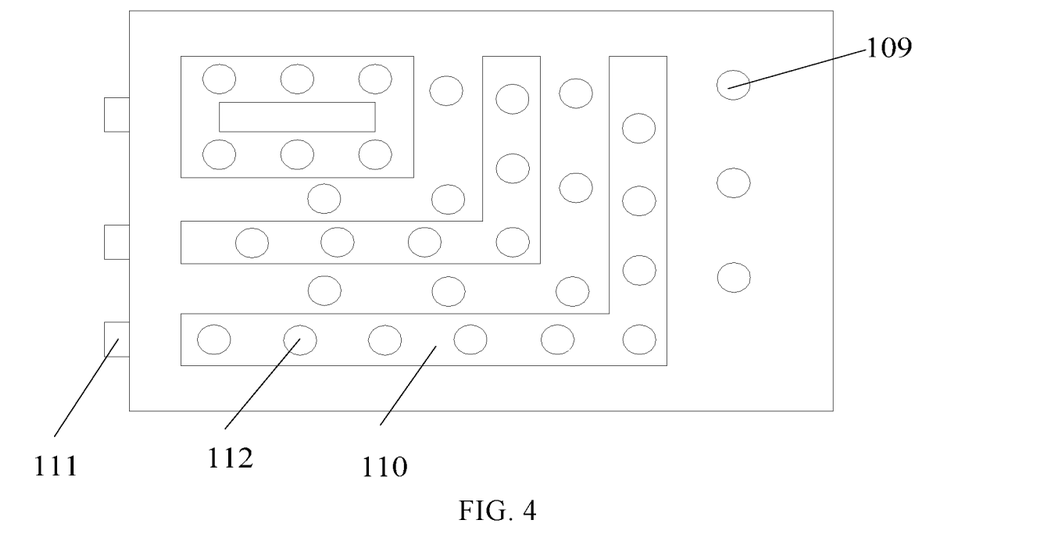
FIG. 4 is a schematic perspective view showing a structure of the vacuum chuck according to the embodiment of the present disclosure.

Referring to FIG. 2 to FIG. 4, in embodiments of the present disclosure, the transfer device further includes: a vacuum chuck 104 mounted to the rotary table 103. The vacuum chuck 104 is configured to hold a display panel and has: a gas chamber 110 formed inside the vacuum chuck 104; a gas suction hole 111 formed in a side surface of the vacuum chuck 104; and an adsorption hole 112 which is formed in an upper surface of the vacuum chuck 104 and which is in communication with the gas suction hole 111 through the gas chamber 110. According to embodiments of the present disclosure, the vacuum chuck 104 may be replaced with any other holder.

Figure 5:
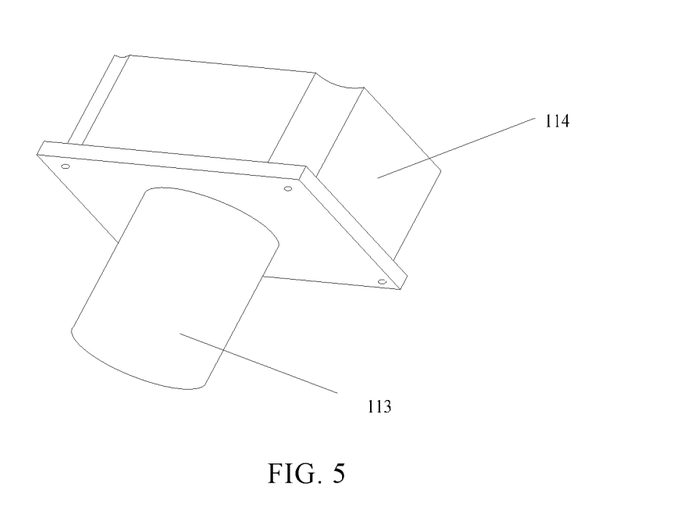
FIG. 5 is a schematic perspective view showing a structure of a first electric motor and a second electric motor according to an embodiment of the present disclosure.

Referring to FIG. 2 to FIG. 5, in embodiments of the present disclosure, the transfer device further includes: a first electric motor 105 through which the rotary stage 102 is mounted to the mount 101 and which is configured to drive the rotary stage 102 to rotate about the first axis 107 with respect to the mount 101; and a second electric motor 106 through which the rotary table 103 is mounted to the rotary stage 102 and which is configured to drive the rotary table 103 to rotate about the second axis 108 with respect to the rotary stage 102. Specifically, each of the first electric motor 105 and the second electric motor 106 includes an output shaft 113 and a housing 114. The housing 114 of the first electric motor 105 is connected to the rotary stage 102 and the output shaft 113 of the first electric motor 105 is connected to the mount 101. The output shaft 113 of the second electric motor 106 is connected to the rotary table 103 and the housing 114 of the second electric motor 106 is connected to the rotary stage 102. Referring to FIG. 2, FIG. 3 and FIG. 5, in embodiments of the present disclosure, the transfer device further includes: a first mounting hole which is formed in the rotary stage 102 and in which the housing 114 of the first electric motor 105 is fitted; and a second mounting hole which is formed in the rotary table 103 and in which the housing 114 of the second electric motor 106 is fitted. Referring to FIG. 2 to FIG. 5, in embodiments of the present disclosure, in the case where the transfer device includes a plurality of rotary tables 103, the transfer device includes: a plurality of second electric motors 106 through which the plurality of rotary tables 103 are mounted to the rotary stage 102, respectively, and which are configured to drive the plurality of rotary tables 103 to rotate about the second axes 108 with respect to the rotary stage 102, respectively.

Various embodiments of the present disclosure provide a transfer device. As shown in FIG. 2 to FIG. 5, the transfer device includes: a mount 101, a rotary stage 102, a rotary table 103, a vacuum chuck 104, a first electric motor 105 and a second electric motor 106.

The rotary stage 102 is mounted to the mount 101 through the first electric motor 105 and the first electric motor 105 is configured to drive the rotary stage 102 to rotate about the first axis 107 with respect to the mount 101. The first axis 107 is located at a central position of the rotary stage 102.

The rotary table 103 is mounted to the rotary stage 102 through the second electric motor 106 and the second electric motor 106 is configured to drive the rotary table 103 to rotate about the second axis 108 with respect to the rotary stage 102. The second axis 108 is located at a central position of the rotary table 103. The vacuum chuck 104 is mounted to the rotary table 103.

FIG. 3 may be specifically referred to for the rotary table 103, the second electric motor 106 and the second axis 108. FIG. 3 is a schematic perspective view showing a structure of the transfer device according to the embodiment of the present disclosure, in which the vacuum chuck 104 is removed.

As shown in FIG. 3, in an embodiment of the present disclosure, the number of the extension parts 1022 may be four, and the four extension parts 1022 may be arranged in a cross shape. According to various embodiments of the present disclosure, the rotary tables 103 are mounted to ends, located away from a central part 1021, of the extension parts 1022 of the rotary stage 102, respectively.

According to various embodiments of the present disclosure, FIG. 4 may be referred to for a specific structure of the vacuum chuck 104. The vacuum chuck 104 may be formed with a plurality of fixing holes 109 for fixing the vacuum chuck 104 to the rotary table 103. According to embodiments of the present disclosure, the fixing holes 109 may be slotted holes or threaded holes.

In an embodiment of the present disclosure, FIG. 5 may be referred to for a specific structure of the first electric motor 105 and the second electric motor 106. Each of the first electric motor 105 and the second electric motor 106 includes an output shaft 113 and a housing 114. The rotary stage 102 is mounted to the mount 101 through the housing 114 of the first electric motor 105, and the first electric motor 105 is configured to drive the rotary stage 102 to rotate about the first axis 107 with respect to the mount 101. The rotary table 103 is mounted to the rotary stage 102 through the housing 114 of the second electric motor 106, and the second electric motor 106 is configured to drive the rotary table 103 to rotate about the second axis 108 with respect to the rotary stage 102.

Figure 6:
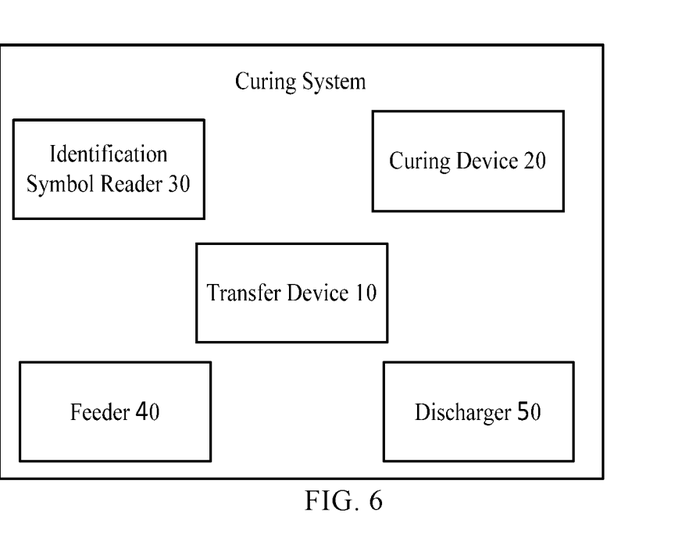
FIG. 6 is a schematic diagram showing a configuration of a curing system according to an embodiment of the present disclosure.
Figure 7:
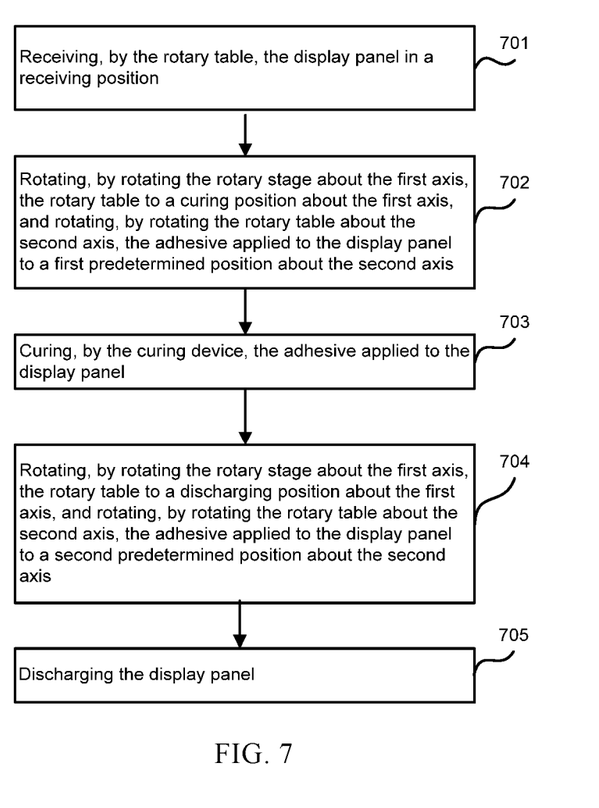
FIG. 7 is a schematic flow diagram of a curing method according to an embodiment of the present disclosure.

Referring to FIG. 6, various embodiments of the present disclosure further provide a curing system. The curing system includes: the transfer device according to any one of the above embodiments; and a curing device 20 configured to cure an adhesive applied to a display panel. For example, the adhesive is a UV curable adhesive, and the curing device 20 is configured to cure the UV curable adhesive applied to the display panel, with ultraviolet radiation.

Figure 8:
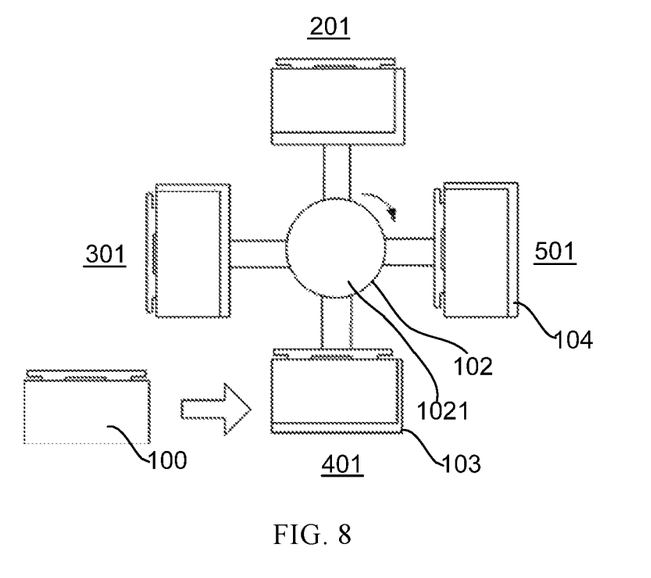
FIG. 8 is a schematic diagram showing a principle of a curing method according to an embodiment of the present disclosure.

Referring to FIG. 6 and FIG. 8, in embodiments of the present disclosure, the curing system may further include: an identification symbol reader 30 configured to read an identification symbol located on the display panel; a feeder 40 configured to feed the display panel to the transfer device; and a discharger 50 configured to discharge the display panel from the transfer device. The identification symbol may be a bar code, a two-dimensional code, an identification character or the like, while the identification symbol reader 30 may be a bar code reader, a two-dimensional code reader, a character scanner or the like.

Referring to FIG. 2 to FIG. 5, the transfer device includes 4 rotary tables 103 arranged at an angular interval of 90 degrees about the first axis 107, such that each time the rotary stage 102 rotates by 90 degrees about the first axis 107, the 4 rotary tables 103 are located in a receiving position 401, an identification symbol reading position 301, a curing position 201, and a discharging position 501, respectively. The receiving position 401, the identification symbol reading position 301, the curing position 201, and the discharging position 501 are arranged at an angular interval of 90 degrees about the first axis 107. In the receiving position 401, the feeder 40 feeds a display panel to a first one of the 4 rotary tables 103 of the transfer device; in the identification symbol reading position 301, the identification symbol reader 30 reads an identification symbol located on a display panel on a second one of the 4 rotary tables 103 of the transfer device; in the curing position 201, the curing device 20 cures an adhesive applied to a display panel on a third one of the 4 rotary tables 103 of the transfer device; and in the discharging position 501, the discharger 50 discharges a display panel located on a fourth one of the 4 rotary tables 103 of the transfer device.

Various embodiments of the present disclosure further provide a method of curing an adhesive, applied to a display panel, by using the curing system according to any one of the above embodiments. Referring to FIG. 2, FIG. 3, and FIG. 6 to FIG. 8, the method includes: a step 701 of receiving, by the rotary table 103, the display panel 100 in a receiving position 401; a step 702 of rotating, by rotating the rotary stage 102 about the first axis 107, the rotary table 103 to a curing position 201 about the first axis 107, and rotating, by rotating the rotary table 103 about the second axis 108, the adhesive applied to the display panel 100 to a first predetermined position about the second axis 108; a step 703 of curing, by the curing device 20, the adhesive applied to the display panel 100; a step 704 of rotating, by rotating the rotary stage 102 about the first axis 107, the rotary table 103 to a discharging position 501 about the first axis 107, and rotating, by rotating the rotary table 103 about the second axis 108, the adhesive applied to the display panel 100 to a second predetermined position about the second axis 108; and a step 705 of discharging the display panel 100.

Referring to FIG. 2, FIG. 3, and FIG. 6 to FIG. 8, in embodiments of the present disclosure, the first predetermined position and the second predetermined position are arranged to be spaced from each other by an angular interval about the second axis.

Referring to FIG. 2, FIG. 3, and FIG. 6 to FIG. 8, in embodiments of the present disclosure, the step 702 includes: rotating, by rotating the rotary table 103 by a first predetermined angle about the second axis 108, the adhesive applied to the display panel 100 to the first predetermined position about the second axis 108; and then rotating, by rotating the rotary stage 102 about the first axis 107, the rotary table 103 to the curing position 201 about the first axis 107. Alternatively, the step 702 includes: rotating, by rotating the rotary stage 102 about the first axis 107, the rotary table 103 to the curing position 201 about the first axis 107; and then rotating, by rotating the rotary table 103 by the first predetermined angle about the second axis 108, the adhesive applied to the display panel 100 to the first predetermined position about the second axis 108.

Referring to FIG. 2, FIG. 3, and FIG. 6 to FIG. 8, in embodiments of the present disclosure, the step 704 includes: rotating, by rotating the rotary stage 102 about the first axis 107, the rotary table 103 to the discharging position 501 about the first axis 107; and then rotating, by rotating the rotary table 103 by a second predetermined angle about the second axis 108, the adhesive applied to the display panel 100 to the second predetermined position about the second axis 108. Alternatively, the step 704 includes: rotating, by rotating the rotary table 103 by the second predetermined angle about the second axis 108, the adhesive applied to the display panel 100 to the second predetermined position about the second axis 108; and then rotating, by rotating the rotary stage 102 about the first axis 107, the rotary table 103 to the discharging position 501 about the first axis 107.

Referring to FIG. 2, FIG. 3, and FIG. 6 to FIG. 8, in embodiments of the present disclosure, the step 702 includes: rotating, by rotating the rotary table 103 by the first predetermined angle about the second axis 108, the adhesive applied to the display panel 100 to the first predetermined position about the second axis 108, while rotating, by rotating the rotary stage 102 about the first axis 107, the rotary table 103 to the curing position 201 about the first axis 107.

Referring to FIG. 2, FIG. 3, and FIG. 6 to FIG. 8, in embodiments of the present disclosure, the step 704 includes: rotating, by rotating the rotary stage 102 about the first axis 107, the rotary table 103 to the discharging position 501 about the first axis 107, while rotating, by rotating the rotary table 103 by the second predetermined angle about the second axis 108, the adhesive applied to the display panel 100 to the second predetermined position about the second axis 108.

Referring to FIG. 2, FIG. 3, and FIG. 6 to FIG. 8, in embodiments of the present disclosure, the method further includes: subsequent to the step 701, and prior to the step 702, rotating, by rotating the rotary stage 102 about the first axis 107, the rotary table 103 to an identification symbol reading position 301 about the first axis 107; and reading, by an identification symbol reader 30, an identification symbol located on the display panel 100.

Referring to FIG. 2, FIG. 3, and FIG. 6 to FIG. 8, in embodiments of the present disclosure, the transfer device includes 4 rotary tables 103 arranged at an angular interval of 90 degrees about the first axis 107, such that each time the rotary stage 102 rotates by 90 degrees about the first axis 107, the 4 rotary tables 103 are located in the receiving position 401, an identification symbol reading position 301, the curing position 201, and a discharging position 501, respectively. The receiving position 401, the identification symbol reading position 301, the curing position 201, and the discharging position 501 are arranged at an angular interval of 90 degrees about the first axis 107. In the receiving position 401, the feeder 40 feeds a display panel 100 to a first one of the 4 rotary tables 103 of the transfer device; in the identification symbol reading position 301, the identification symbol reader 30 reads an identification symbol located on a display panel 100 on a second one of the 4 rotary tables 103 of the transfer device; in the curing position 201, the curing device 20 cures an adhesive applied to a display panel 100 on a third one of the 4 rotary tables 103 of the transfer device; and in the discharging position 501, the discharger 50 discharges a display panel 100 located on a fourth one of the 4 rotary tables 103 of the transfer device.

Embodiments of the present disclosure further provide a method of curing an adhesive, applied to a display panel, by using the curing system according to any one of the above embodiments. Referring to FIG. 2, FIG. 3, and FIG. 6 to FIG. 8, the method includes: a receiving step of receiving, by one of the plurality of rotary tables 103, the display panel 100 in a receiving position 401; a first transferring step of rotating, by rotating the rotary stage 102 about the first axis 107, the one of the plurality of rotary tables 103 to a curing position 201 about the first axis 107, and rotating, by rotating the one of the plurality of rotary tables 103 about the second axis 108, the adhesive applied to the display panel 100 to a first predetermined position about the second axis 108; a curing step of curing, by the curing device 20, the adhesive applied to the display panel 100; a second transferring step of rotating, by rotating the rotary stage 102 about the first axis 107, the one of the plurality of rotary tables 103 to a discharging position 501 about the first axis 107, and rotating, by rotating the one of the plurality of rotary tables 103 about the second axis 108, the adhesive applied to the display panel 100 to a second predetermined position about the second axis 108; and a discharging step of discharging the display panel 100.

Referring to FIG. 2, FIG. 3, and FIG. 6 to FIG. 8, in embodiments of the present disclosure, the first transferring step includes: rotating, by rotating the one of the plurality of rotary tables 103 by a first predetermined angle about the second axis 108, the adhesive applied to the display panel 100 to the first predetermined position about the second axis 108; and then rotating, by rotating the rotary stage 102 about the first axis 107, the one of the plurality of rotary tables 103 to the curing position 201 about the first axis 107. Alternatively, the first transferring step includes: rotating, by rotating the rotary stage 102 about the first axis 107, the one of the plurality of rotary tables 103 to the curing position 201 about the first axis 107; and then rotating, by rotating the one of the plurality of rotary tables 103 by the first predetermined angle about the second axis 108, the adhesive applied to the display panel 100 to the first predetermined position about the second axis 108.

Referring to FIG. 2, FIG. 3, and FIG. 6 to FIG. 8, in embodiments of the present disclosure, the second transferring step includes: rotating, by rotating the rotary stage 102 about the first axis 107, the one of the plurality of rotary tables 103 to the discharging position 501 about the first axis 107; and then rotating, by rotating the one of the plurality of rotary tables 103 by a second predetermined angle about the second axis 108, the adhesive applied to the display panel 100 to the second predetermined position about the second axis 108. Alternatively, the second transferring step includes: rotating, by rotating the one of the plurality of rotary tables 103 by the second predetermined angle about the second axis 108, the adhesive applied to the display panel 100 to the second predetermined position about the second axis 108; and then rotating, by rotating the rotary stage 102 about the first axis 107, the one of the plurality of rotary tables 103 to the discharging position 501 about the first axis 107.

Referring to FIG. 2, FIG. 3, and FIG. 6 to FIG. 8, in embodiments of the present disclosure, the first transferring step includes: rotating, by rotating the one of the plurality of rotary tables 103 by the first predetermined angle about the second axis 108, the adhesive applied to the display panel 100 to the first predetermined position about the second axis 108, while rotating, by rotating the rotary stage 102 about the first axis 107, the one of the plurality of rotary tables 103 to the curing position 201 about the first axis 107.

Referring to FIG. 2, FIG. 3, and FIG. 6 to FIG. 8, in embodiments of the present disclosure, the second transferring step includes: rotating, by rotating the rotary stage 102 about the first axis 107, the one of the plurality of rotary tables 103 to the discharging position 501 about the first axis 107, while rotating, by rotating the one of the plurality of rotary tables 103 by the second predetermined angle about the second axis 108, the adhesive applied to the display panel 100 to the second predetermined position about the second axis 108.

Referring to FIG. 2, FIG. 3, and FIG. 6 to FIG. 8, in embodiments of the present disclosure, the method further includes: subsequent to the receiving step, and prior to the first transferring step, rotating, by rotating the rotary stage 102 about the first axis 107, the one of the plurality of rotary tables 103 to an identification symbol reading position 301 about the first axis 107; and reading, by an identification symbol reader 30, an identification symbol located on the display panel 100. In the curing method according to the embodiments of the present disclosure, the display panel is transferred by the rotary stage and the rotary tables of the transfer device in a curing process, thereby improving both transfer efficiency and production capacity of the curing system.

In this way, the adhesive applied to the display panel is cured while the display panel is transferred and the identification symbol on the display panel is read. In addition, a display panel to which no printed circuit board assembly (PCBA) is bonded can be prevented from entering a subsequent process step by reading the identification symbol on the display panel prior to curing the adhesive applied to the display panel.

A further description of the present disclosure will be made as below with reference to embodiments taken in conjunction with the accompanying drawings, but the present disclosure is not limited to the following embodiments.

FIG. 8 is a schematic diagram showing a principle of a curing method according to an embodiment of the present disclosure. The curing method is used to cure an adhesive, applied to a display panel, by using the curing system. Referring to FIG. 2, FIG. 3, FIG. 6 and FIG. 8, the method includes the following steps. In a receiving step, a display panel 100 is received from a feeder 40 by one of the plurality of rotary tables 103 in a receiving position 401.

In various embodiments of the present disclosure, after the display panel 100 is received from the feeder 40 by the one of the plurality of rotary tables 103, the display panel 100 is fixed to the one of the plurality of rotary tables 103 by a vacuum chuck 104. Specifically, a valve on a gas suctioning pipe is switched on. A vacuum pump is connected through the gas suctioning pipe to an adsorption hole 111 of a vacuum chuck 104 mounted to the one of the plurality of rotary tables 103. Air between the vacuum chuck 104 and the display panel 100 is evacuated through a gas chamber 110 and the gas suction hole 112 of the vacuum chuck 104, so that a vacuum state is reached between the vacuum chuck 104 and the display panel 100, thereby fixing the display panel 100 to the vacuum chuck 104 mounted to the one of the plurality of rotary tables 103.

In a first transferring step, an adhesive applied to the display panel 100 on the one of the plurality of rotary tables 103 is rotated to a first predetermined position about the second axis 108 by anticlockwise rotating the one of the plurality of rotary tables 103 by 180 degrees about the second axis 108.

Referring to FIG. 8, when the display panel 100 is received from the feeder 40 by the one of the plurality of rotary tables 103, the adhesive applied to the display panel 100 is located on a side closer to a central part 1021 of the rotary stage 102. After the one of the plurality of rotary tables 103 is anticlockwise rotated by 180 degrees about the second axis 108, the adhesive applied to the display panel 100 is rotated to a side farther from the central part 1021 of the rotary stage 102 about the second axis 108.

In a second transferring step, the one of the plurality of rotary tables 103 is rotated to an identification symbol reading position 301 about the first axis 107 by clockwise rotating the rotary stage 102 by 90 degrees about the first axis 107. In an identifying step, an identification symbol located on the display panel 100 is read by an identification symbol reader 30. In a third transferring step, the one of the plurality of rotary tables 103 is rotated to the curing position 201 about the first axis 107 by clockwise rotating the rotary stage 102 by 90 degrees about the first axis 107. In a curing step, the adhesive applied to the display panel 100 is cured with ultraviolet radiation by a curing device 20.

In a fourth transferring step, the one of the plurality of rotary tables 103 is rotated to a discharging position 501 about the first axis 107 by clockwise rotating the rotary stage 102 by 90 degrees about the first axis 107. In a fifth transferring step, an adhesive applied to the display panel 100 on the one of the plurality of rotary tables 103 is rotated to a second predetermined position about the second axis 108 by clockwise rotating the one of the plurality of rotary tables 103 by 180 degrees about the second axis 108. In a discharging step, the display panel 100 is discharged. Thereby, the whole curing process is completed.

Referring to FIG. 8, after the rotary stage 102 is clockwise rotated by 90 degrees about the first axis 107, the adhesive applied to the display panel 100 is located on a side farther from the central part 1021 of the rotary stage 102. After the one of the plurality of rotary tables 103 is clockwise rotated by 180 degrees about the second axis 108, the adhesive applied to the display panel 100 is rotated to a side closer to the central part 1021 of the rotary stage 102 about the second axis 108. At this time, the valve on the gas suctioning pipe connected with the vacuum pump is switched off, so that the display panel 100 is discharged.

In the transferring method according to the embodiments of the present disclosure, the display panel is transferred by the rotary stage and the rotary tables of the transfer device in a curing process. Time for curing and transferring each display panel is reduced to about 4 s, thereby greatly improving transfer efficiency and production capacity. In addition, a display panel to which no printed circuit board assembly is bonded can be prevented from entering a subsequent process step by reading the identification symbol on the display panel prior to curing the adhesive applied to the display panel. The four rotary tables 103 alternately operate, so that a buffer function is achieved.

Although some exemplary embodiments of the present disclosure have been shown and described above, it would be appreciated by a person skilled in the art that many modifications or changes may be made therein without departing from the principle and spirit of the present disclosure, the scope of which is defined in the appended claims and their equivalents.

What is claimed is:

1. A curing system comprising:
   a transfer device including:
   a mount;
   a rotary stage mounted to the mount and configured to be rotatable about a first axis;
   four rotary tables mounted to the rotary stage and configured to be rotatable about four second axes, respectively;
   a first electric motor through which the rotary stage is mounted to the mount and which is configured to drive the rotary stage to rotate about the first axis with respect to the mount; and
   four second electric motors through which the four rotary tables are mounted to the rotary stage, respectively, and which are configured to drive the four rotary tables to rotate about the four second axes with respect to the rotary stage, respectively,
   wherein each of the first electric motor and the four second electric motors comprises an output shaft and a housing,
   wherein the housing of the first electric motor is connected to the rotary stage and the output shaft of the first electric motor is connected to the mount, and
   wherein the output shafts of the four second electric motors are connected to the four rotary tables, respectively, and the housings of the four second electric motors are connected to the rotary stage;
   a curing device configured to cure an adhesive applied to a display panel;
   an identification symbol reader configured to read an identification symbol located on the display panel;
   a feeder configured to feed the display panel to the transfer device; and
   a discharger configured to discharge the display panel from the transfer device,
   wherein the four rotary tables are arranged at an angular interval of 90 degrees about the first axis, such that each time the rotary stage rotates by 90 degrees about the first axis, the four rotary tables are located in a receiving position, an identification symbol reading position, a curing position, and a discharging position, respectively; wherein the receiving position, the identification symbol reading position, the curing position, and the discharging position are arranged at an angular interval of 90 degrees about the first axis; and wherein in the receiving position, the feeder feeds a display panel to a first one of the four rotary tables of the transfer device; in the identification symbol reading position, the identification symbol reader reads an identification symbol located on a display panel on a second one of the four rotary tables of the transfer device; in the curing position, the curing device cures an adhesive applied to a display panel on a third one of the four rotary tables of the transfer device; and in the discharging position, the discharger discharges a display panel located on a fourth one of the four rotary tables of the transfer device.

2. The curing system of claim 1, wherein:
the adhesive is a UV curable adhesive, and the curing device is configured to cure the UV curable adhesive applied to the display panel, with ultraviolet radiation.

3. A method of curing an adhesive, applied to a display panel, by using the curing system of claim 1, the method comprising:
receiving, by one rotary table of the four rotary tables, the display panel in a receiving position;
rotating, by rotating the rotary stage about the first axis, the one rotary table to a curing position about the first axis, and rotating, by rotating the one rotary table about one second axis of the four axes, the adhesive applied to the display panel to a first predetermined position about the one second axis;
curing, by the curing device, the adhesive applied to the display panel;
rotating, by rotating the rotary stage about the first axis, the one rotary table to a discharging position about the first axis, and rotating, by rotating the one rotary table about the one second axis, the adhesive applied to the display panel to a second predetermined position about the one second axis; and
discharging the display panel.

4. The method of claim 3, wherein rotating, by rotating the rotary stage about the first axis, the one rotary table to the curing position about the first axis, and rotating, by rotating the one rotary table about the one second axis, the adhesive applied to the display panel to the first predetermined position about the one second axis, comprises:
rotating, by rotating the one rotary table by a first predetermined angle about the one second axis, the adhesive applied to the display panel to the first predetermined position about the one second axis; and then rotating, by rotating the rotary stage about the first axis, the one rotary table to the curing position about the first axis; or
rotating, by rotating the rotary stage about the first axis, the one rotary table to the curing position about the first axis; and then rotating, by rotating the one rotary table by the first predetermined angle about the one second axis, the adhesive applied to the display panel to the first predetermined position about the one second axis.

5. The method of claim 3, wherein rotating, by rotating the rotary stage about the first axis, the one rotary table to the discharging position about the first axis, and rotating, by rotating the one rotary table about the one second axis, the adhesive applied to the display panel to the second predetermined position about the one second axis, comprises:
rotating, by rotating the rotary stage about the first axis, the one rotary table to the discharging position about the first axis; and then rotating, by rotating the one rotary table by a second predetermined angle about the one second axis, the adhesive applied to the display panel to the second predetermined position about the one second axis; or
rotating, by rotating the one rotary table by the second predetermined angle about the one second axis, the adhesive applied to the display panel to the second predetermined position about the one second axis; and then rotating, by rotating the rotary stage about the first axis, the one rotary table to the discharging position about the first axis.

6. The method of claim 3, wherein rotating, by rotating the rotary stage about the first axis, the one rotary table to the curing position about the first axis, and rotating, by rotating the one rotary table about the one second axis, the adhesive applied to the display panel to the first predetermined position about the one second axis, comprises:
rotating, by rotating the one rotary table by the first predetermined angle about the one second axis, the adhesive applied to the display panel to the first predetermined position about the one second axis, while rotating, by rotating the rotary stage about the first axis, the one rotary table to the curing position about the first axis.

7. The method of claim 3, wherein rotating, by rotating the rotary stage about the first axis, the one rotary table to the discharging position about the first axis, and rotating, by rotating the one rotary table about the one second axis, the adhesive applied to the display panel to the second predetermined position about the one second axis, comprises:
rotating, by rotating the rotary stage about the first axis, the one rotary table to the discharging position about the first axis, while rotating, by rotating the one rotary table by the second predetermined angle about the one second axis, the adhesive applied to the display panel to the second predetermined position about the one second axis.

8. The method of claim 3, further comprising:
subsequent to receiving, by the one rotary table, the display panel in the receiving position, and prior to rotating, by rotating the rotary stage about the first axis, the one rotary table to the curing position about the first axis, and rotating, by rotating the one rotary table about the one second axis, the adhesive applied to the display panel to the first predetermined position about the one second axis, rotating, by rotating the rotary stage about the first axis, the one rotary table to an identification symbol reading position about the first axis; and
reading, by an identification symbol reader, an identification symbol located on the display panel.

9. The curing system of claim 1, wherein:
the rotary stage comprises: a central part; and four extension parts extending outwards from the central part; and
the four rotary tables are mounted to ends, located away from the central part, of the four extension parts of the rotary stage, respectively.

10. The curing system of claim 1, wherein:
the transfer device further comprises:
a vacuum chuck mounted to each of the four rotary tables.

11. The curing system of claim 1, wherein:
the first axis is located at a central position of the rotary stage; and
the four second axes are located at central positions of the four rotary tables, respectively.

12. The curing system of claim 11, wherein:
each of the first axis and the four second axes is a vertical axis.

13. The curing system of claim 10, wherein:
the vacuum chuck is configured to hold a display panel and has:
a gas chamber formed inside the vacuum chuck;
a gas suction hole formed in a side surface of the vacuum chuck; and
an adsorption hole which is formed in an upper surface of the vacuum chuck and which is in communication with the gas suction hole through the gas chamber.

* * * * *